Dec. 25, 1956 J. A. TUCK 2,775,296
MACHINE FOR SCORING APPAREL BELT AND LIKE STRAP BODIES
Original Filed Oct. 19, 1950 4 Sheets-Sheet 1

INVENTOR.
BY James Allen Tuck,
George D. Richards
Attorney

Dec. 25, 1956  J. A. TUCK  2,775,296
MACHINE FOR SCORING APPAREL BELT AND LIKE STRAP BODIES
Original Filed Oct. 19, 1950  4 Sheets-Sheet 2
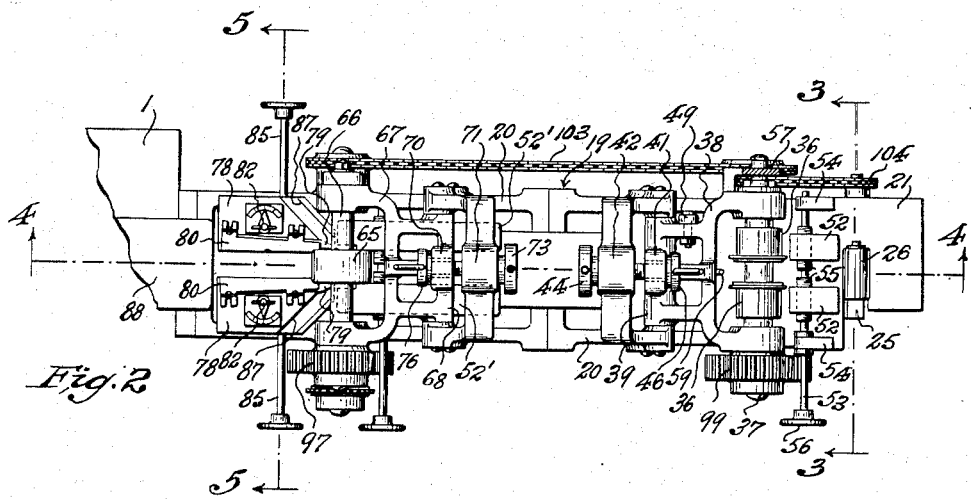
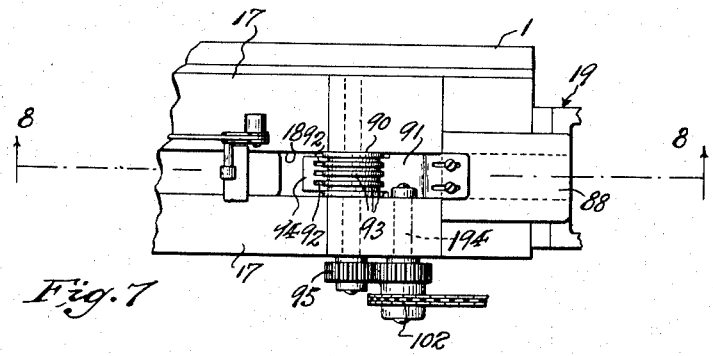
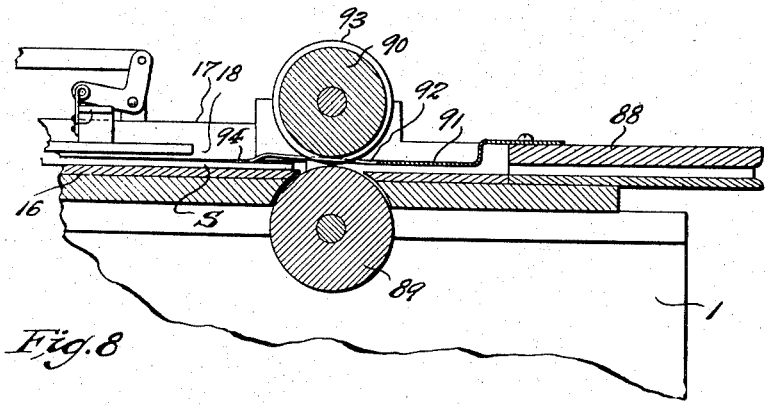
INVENTOR.
James Allen Tuck,
BY
George D. Richards
Attorney Dec. 25, 1956　　　　　J. A. TUCK　　　　2,775,296
MACHINE FOR SCORING APPAREL BELT AND LIKE STRAP BODIES
Original Filed Oct. 19, 1950　　　　　　　　　4 Sheets-Sheet 3

INVENTOR.
James Allen Tuck,
BY
George D. Richards
Attorney

Dec. 25, 1956  J. A. TUCK  2,775,296
MACHINE FOR SCORING APPAREL BELT AND LIKE STRAP BODIES
Original Filed Oct. 19, 1950  4 Sheets-Sheet 4

INVENTOR.
James Allen Tuck,
BY
Attorney

United States Patent Office 2,775,296
Patented Dec. 25, 1956

2,775,296

MACHINE FOR SCORING APPAREL BELT AND LIKE STRAP BODIES

James Allen Tuck, Elmhurst, N. Y., assignor, by mesne assignments, to Louis Krantz, Bronx, N. Y.; Leon Krantz and Hannah Krantz, executors of said Louis Krantz, deceased, assignors to Leon Krantz, Bronx, N. Y.

Original application October 19, 1950, Serial No. 191,001, now Patent No. 2,690,910, dated October 5, 1954. Divided and this application June 24, 1954, Serial No. 440,732

9 Claims. (Cl. 164—39)

This invention relates to a machine for automatically producing apparel belt and like strap bodies from strip stock ready for reception of buckles by which the same are equipped for use; this application being a division of application Ser. No. 191,001, filed October 19, 1950, now Patent No. 2,690,910.

The present invention has for an object to provide, in an automatic machine for the stated purpose, mechanism to receive and feed a stock strip into the machine, and thereupon perform the operations of embossing or scoring the face surface of the stock strip, and beveling or trimming the edges of the stock strip, all preparatory to thereupon delivering the stock strip to punching mechanism by which buckle reception slots and suitably spaced buckle tongue reception openings or perforations are formed therein, and the shaping of the free end of the belt or strap is effected.

More specifically other objects of this invention are to provide means for controlling timed successive admission of strip stock into the machine; to provide means in cooperative relation to the embossing or scoring means for controlling initiation of the embossing or scoring operation in spaced relation to and from the leading end of a stock strip; to provide means to adjust the embossing and scoring means in accommodation to stock strips of different widths and thicknesses; means to adjustably accommodate the beveling or trimming means to stock strips of different widths and thicknesses; and means to receive and control the embossed or scored and/or the beveled or trimmed stock strips preparatory to delivery thereof to the punching and cutting means of the machine.

Other objects of this invention, not at this time more particularly enumerated, will be understood from the following detailed description of the same.

An illustrative embodiment of this invention is shown in the accompanying drawings, in which:

Fig. 1 is a side elevational view of the machine according to this invention for producing apparel belt or like strap bodies.

Fig. 2 is a top plan view of the strip stock receiving end of the machine which includes the stock embossing or scoring means and the edge beveling or trimming means, this view being drawn on an enlarged scale; Fig. 3 is a fragmentary end elevation in part section, taken on line 3—3 in Fig. 2; Fig. 4 is a longitudinal vertical sectional view, taken on line 4—4 in Fig. 2; Fig. 5 is a fragmentary transverse sectional view, taken on line 5—5 in Fig. 2, and drawn on a further enlarged scale; and Fig. 6 is a fragmentary plan view of strip stock as initially worked upon by the embossing or scoring means of the machine.

Fig. 7 is a fragmentary plan view on an enlarged scale showing the means for positioning of a stock strip in a receiving means subject to delivery therefrom to the punching, cutting and stamping means of the machine; and Fig. 8 is a longitudinal section therethrough, taken on line 8—8 in Fig. 7, but drawn on a further enlarged scale.

Similar characters of reference are employed in the above described views, to indicate corresponding parts.

Figure 1:
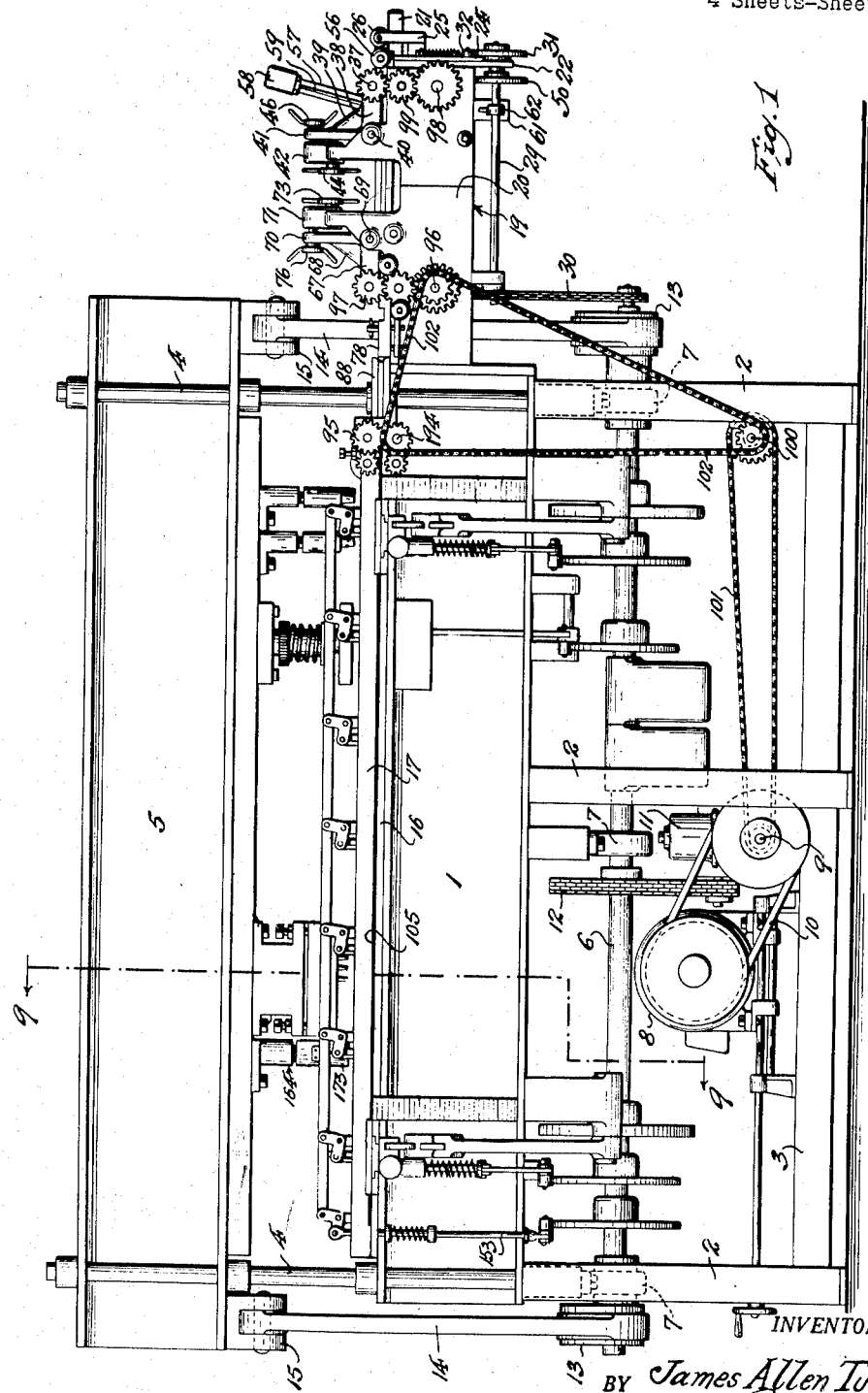
Figure 9:
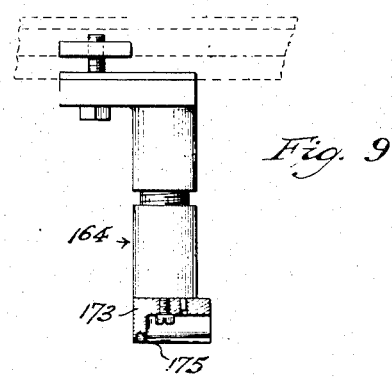
Fig. 9 is a detail side elevational view in part section of a tip cutting and embossing or scoring device.
Figure 10:
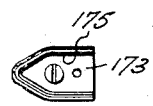
Fig. 10 is a bottom plan view of said cutting and embossing or scoring device.

Referring to the drawings, the reference character 1 indicates the stationary bed member of the machine which is supported by suitably disposed leg portions 2 of a base frame 3. Affixed to the bed member, to upstand therefrom adjacent to the respective end portions thereof, are guide standards or columns 4. Mounted on and between said standards or columns 4, subject to vertical reciprocation thereon relative to the bed member 1, is a head member 5.

The main shaft 6 of the machine is journaled in bearings 7 which depend from the bed member 1, and which extend in longitudinally aligned relation to the latter. Power may be transmitted to said main shaft from any suitable source; preferably, however, an electric motor 8 is provided to serve as a power source, and the same is suitably mounted on the base frame 3 of the machine. Power is transmitted from the motor 8 to the main shaft 6 by suitable transmission means. Illustratively, a countershaft 9 is driven from the motor 8 by belt and pulley or like transmission 10. The countershaft 9 operates reduction gear means contained in the housing 11, and said reduction gear means in turn transmits the power through chain and sprocket or like transmission 12 to said main shaft 6.

The head member 5 is vertically reciprocated on the guide standards or columns 4 by eccentrics 13 with which the opposite ends of the main shaft are respectively provided. Connecting rods 14 are actuated by the eccentrics 13, and are respectively pivotally connected by knuckles 15 with opposite ends of the head member 5.

Affixed to the top of the bed member 1 is a bed plate 16. Mounted on the bed plate 16, in outwardly offset parallel relation to the perpendicular axis of the head member 5 is a longitudinally extending stock strip receiving means comprising laterally spaced wall member 17. The space intermediate said wall members provides an endwise open stock strip receiving trough 18, the floor of which is constituted by the underlying portion of said bed plate 16.

Supported in extension from the receiving end of the bed member 1, so as to extend in axial alignment with the receiving trough 18, is a stock strip feeding means, which also includes the means for embossing or scoring stock strips passed therethrough, and means for beveling or trimming the edges of stock strips passed therethrough. Said feeding means comprises a framework 19 having laterally spaced side plates 20. To the free or outer end of said framework, to extend outwardly therefrom between said side plates 20, is mounted a horizontal stock strip receiving platform 21. Also affixed to the free or outer end of the framework 19, to extend downwardly beneath the inward portion of the receiving platform 21, is a transverse slideway plate 22 which is provided with spaced vertical guide track members 23. Mounted on the slideway plate 22, so as to be guided by the track members 23, is a slide plate 24 which is subject to vertical reciprocatory movements. Carried by said slide plate 24 is an outwardly offset, upwardly extending carrier arm 25 upon the upper end of which is carried a stock strip gripping roller 26 which is disposed to overhang and extend across the receiving platform 21. Mounted in and across an opening which is provided in the receiving platform, and so as to be opposed to the gripping roller 26 is a driven stock strip feed roller 27, the shaft 28 of which is journaled in said receiving platform 21. The means for driving said feed roller 27 will be later herein described.

Supported in connection with and extending beneath the frame work 19 of the stock strip feeding means is a lay shaft 29. Said lay shaft 29 is driven from the main shaft 6 by chain and sprocket or like transmission 30. Mounted on the outer end of the lay shaft 29 is a cam 31 which cooperates with a roller stud 32 with which the slide plate 24 is provided. Pull springs 33 are inter-connected between the slide plate 24 and slideway plate 22 so as to cause the roller stud 32 to follow the periphery of the cam 31. The cam 31 operates to produce timed rise and descent of the stock strip gripping roller 26, whereby at times to lift the latter away from the feed roller 27, and at proper times to cause said gripping roller 26 to descend and engage a stock strip, inserted between the gripping and feed rollers, in the nip of said rollers, whereby the thus engaged stock strip is fed into the machine.

Positioned inwardly of the stock strip gripping and feed rollers is the means for embossing or ornamentally scoring the face of stock strips introduced into the machine. This embossing or scoring means comprises a bed roll 34 which is fixed on a transverse driven shaft 35 journaled in and across the side plates 20 of the framework 19. Disposed above said bed roll 34, for cooperation therewith, are a pair of scoring rolls 36 which are mounted on a transverse driven shaft 37, subject to adjustment on said shaft toward and from one another to accommodate the action thereof to stock strips of different widths. The driven shaft 37 is journaled in and across an outwardly extending horizontal bifurcate arm 38 of a bell-crank frame 39 which is pivotally supported on a transverse fulcrum shaft 40 that is affixed to and extends across the framework 19 between the side plates 20 thereof. The upwardly extending vertical arm 41 of the bell-crank frame 39 is opposed to an upstanding stationary cross-head 42, the sides of which extend from the side plates 20 of the framework 19, so that said cross-head straddles the path of movement of stock strips through the feeding means. Supported by the cross-head 42 is a compression spring 43 which thrusts against the vertical arm 41 of the bell-crank frame 39, thus yieldably rocking the latter so as to down swing its horizontal arm 38, whereby to urge the scoring rolls 36 into operative engagement with a stock strip nipped between said rolls and the bed roll 34. Means is provided for suitably regulating the tension of the compression spring 43, the same comprising a manipulatable backing member 44 which is threaded into the cross-head 42 behind said compression spring. Means is also provided for adjustably limiting the movement of the bell-crank frame 39 under the yieldable thrust of the compression spring 43, so as to thereby limit the operative downward movement of the scoring rolls 36 toward the bed roll 34, to thereby accommodate the scoring action of the scoring rolls to different thicknesses of strip stock. This latter means comprises a manipulatable stop screw 45 having an enlarged head 46 adapted to be abutted by the vertical arm 41 of the bell-crank frame 39. The shank of said stop screw 45 extends freely through an opening 47 with which the vertical arm 41 of the bell-crank frame 39 is provided; said shank being threaded into the cross-head 42 so that the stop screw is supported thereby in stationary relation to the movable bell-crank frame. Means is provided for temporarily lifting the scoring rolls 36, at proper times, out of operative relation to the bed roll 34 and a stock strip entering between the latter and said scoring rolls. This means comprises a lever 48 which is pivotally supported in connection with the framework 19, said lever 48 being connected by a link 49 with the horizontal arm 38 of the bell-crank frame. The means for actuating the lever 48 comprises a cam 50 which is fixed on the lay shaft 29; said lever 48 being provided with a roller stud 51 to follow the periphery of said cam. The means for transmitting power to the above described embossing or scoring means will be later herein described.

Superposed upon the receiving platform 21 between the gripping and feed rollers 26—27 and the bed and scoring rolls 34—36 are laterally opposed stock strip guide blocks 52 which can be adjusted toward and from one another so as to define an intermediate guide passage adjustably sized to accommodate stock strips of various widths. Manipulatable means is provided for adjusting said guide blocks 52, said means comprising a transverse shaft 53 journaled in and between bearing members 54. Fixed on said shaft 53 are right and left screw-threaded adjusters 55 which are respectively threaded through the respective guide blocks 52. The shaft 53 is provided, on at least one externally extending portion thereof, with a hand wheel 56 by which it can be rotatively manipulated to effect desired relatively spaced disposition of the guide blocks 52.

Cooperative with the above described embossing or scoring means is a stock strip stop means which is arranged to be operative at a predetermined inwardly spaced location beyond the nip of the bed roll 34 and scoring rolls 36. Supported from the framework 19 by an upwardly extending bracket arm 57 is a solenoid 58 which overhangs the path of movement of a stock strip passing between the bed and scoring rolls 34—36. Dependent from said solenoid and adapted to be controlled thereby is a stop rod 59. In its lowered stock strip arresting position, the lower end of this stop rod engages the floor of a passage 60 through which the stock strip advances. Timed upward lift of said stop rod 59 out of the path of a stop strip, whereby to release the latter for onward movement, is effected by energizing the solenoid 58. The electric circuit (not shown) by which the solenoid is served includes a normally open switch 61 which is supported from the framework 19 adjacent to the lay shaft 29. Mounted on the lay shaft 29 is a cam 62 which cooperates with the switch 61 so as to close the latter at proper times, and thus cause the solenoid 58 to be temporarily energized for stop rod releasing effect.

Supported by the framework 19, inwardly beyond the above described embossing or scoring means, is a stock strip beveling or trimming means including power driven means for advancing stock strips therethrough. The means for advancing a stock strip through the edge beveling or trimming means comprises a lower drive roller 63, which is fixed on a transverse driven shaft 64 journaled in and across the side plates 20 of the framework 19, and an upper drive roller 65. The upper drive roller 65 is mounted on a transverse driven shaft 66 which is journaled in and across an inwardly extending horizontal bifurcate arm 67 of a bell-crank frame 68; the latter being pivotally supported on a transverse fulcrum shaft 69 that is affixed to and extends across the framework 19 between the side plates 20 thereof. The upwardly extending vertical arm 70 of the bell-crank frame 68 is opposed to another upstanding stationary cross-head 71, the sides of which extend from the side plates 20 of framework 19, so that said cross-head straddles the path of movement of advancing stock strips. The bell-crank frame 68 is yieldably rocked in direction to urge the upper drive roller 65 toward the lower drive roller 63, whereby to grip an advancing stock strip in the nip of said rollers so as to thereupon drive said stock strip through the edge beveling or trimming means. The means for so rocking the bell-crank 68 is similar in construction and operation to that already above described in connection with the bell-crank frame 39 of the embossing or scoring means, and includes in connection with the cross-head 71 a compression spring 72 and an adjustable backing member 73 therefor, and also includes an adjustable limiting stop screw 74 which extends through an opening 75 in the vertical arm 70 of bell-crank frame 68 into threaded connection with said cross-head 71; said stop screw 74 having an enlarged head 76 adapted to be abutted by said vertical arm 70 of the bell-crank frame 68. The stock strip edge beveling or trimming means comprises laterally opposed supporting blocks 77 which are suitably affixed to the framework 19 so as to respectively border opposite sides of the path of movement of stock strips advanced by the drive rollers 63—65. Supported upon the supporting blocks 77 are carrier plates 78 upon which the cutting knives 79 are mounted, the latter being secured in place by clamp plates 80. The carrier plates 78 and clamp plates 80 are respectively formed with longitudinal ledges 81 (see Fig. 5) which border the cutting knives in straddling relation to the longitudinal marginal portions of stock strips advanced between said cutting knives, thus serving to support and guide the advancing stock strips as they move between said cutting knives. The outer ends of the cutting knives terminate in sharp, chisel-like cutting edges which are positioned close to the discharge side of the nip of the drive rollers 63—65. The carrier plates 78 are subject to vertical adjustment relative to the supporting blocks 77 by means of adjusting screw devices 82, thus accommodating the cutting knives to different thicknesses of strip stock. Means is also provided for adjusting the carrier plates 78 toward and from the path of movement of advanced stock strips, whereby to accommodate the cutting knives to different widths of strip stock. To this end, each carrier plate 78 is provided with an abutment piece 83 which extends therefrom into a cavity 84 with which the underlying supporting block 77 is provided (see Fig. 5). Threaded into said supporting block is a manipulatable adjusting screw 85 which, when in-turned, is adapted to engage the outer face of the abutment piece 83 so as to move the carrier plate and associated cutting knife inwardly toward the path of movement of advancing stock strips. By out-turning said adjusting screw 85, the carrier plate and associated cutting knife is moved outwardly relative to the path of movement of advancing stock strips by a compression spring 86 which is mounted in the underlying supporting block 77 to thrust against the inner face of the abutment piece 83. The supporting blocks 77 are provided with discharge channels 87 which lead outwardly therethrough from the sharp cutting ends of the cutting knives. Through these discharge channels the cuttings or waste removed from the stock strip edges by the cutting knives is led outwardly for discharge from the machine. Laterally adjustable guide blocks 52' (similar to above described adjustable guide block means 52) are provided to guide stock strips to the drive rollers 63–65; the same being adjustable to accommodate stock strips of different widths.

Upon leaving the stock strip edge beveling or trimming means, a stock strip is led therefrom through suitable intermediate guide means 88 for passage into the heretofore mentioned receiving trough 18 of the machine. Located adjacent to the intake end of said receiving trough 18 is another pair of stock strip drive rollers, comprising a lower drive roller 89, the periphery of which projects through and somewhat above the floor level of said receiving trough 18, and an upper drive roller 90. Means is provided for arresting advancing movement of a stock strip into the receiving trough immediately it is fully entered within the latter upon discharge from the nip of said drive rollers 89—90 (see Figs. 7 and 8). The means for this purpose comprises an arrester or brake spring 91 of the leaf type, beneath which an advancing stock strip must pass as it traverses the drive rollers 89—90. The rearward or outer end portion of this arrester or brake spring 91 is suitably anchored to a stationary part of the machine, as e. g. to the top of the guide means 88, so that the body thereof passes between the drive rolls 89—90 above the nip thereof and in upwardly spaced relation to the floor of the receiving trough 18. To permit such disposition of the arrester or brake spring body, said body is provided with longitudinal slots 92, and the periphery of the upper drive roller 90 is annularly grooved to provide annular radially projecting ribs 93 which project through said slots 92 of the spring body for stock strip nipping cooperation with the underlying drive roller 89. The free end portion of the arrester or brake spring, which projects inwardly from the nip of the drive rollers 89—90, is provided with a downwardly offset gripper portion 94 which, by the resilient tension of said spring body, is yieldably urged toward the floor of the receiving trough 18 so as to arrestingly grip a stock strip engaged between the same and said floor, after said stock strip escapes the nip of the drive rollers 89—90.

It is now convenient to describe the means for transmitting operating power to the drive rollers 89—90, to the drive rollers 63—65 which serve the edge beveling or trimming means, to the bed and scoring rolls 34—36 of the embossing or scoring means, and to the feed roller 27. As best shown in Fig. 1, drive rollers 89—90 are driven from a drive shaft 194 by intermeshing gearing 95; the drive rollers 63—65 are driven from a drive shaft 96 by intermeshing gearing 97; and the bed and scoring rolls 34—36 are driven from a drive shaft 98 by intermeshing gearing 99. Mounted across the main base frame of the machine is a countershaft 100 which is driven from the motor driven countershaft 9 by a sprocket and chain or like transmission 101. Power is transmitted from the countershaft 100 to both the drive shaft 194, which serves the driver rollers 89—90, and the drive shaft 96, which serves the drive rollers 63—65, by means of a sprocket and chain or like transmission 102, so that said rollers are continuously driven. Power is transmitted from the shaft 96, which serves the drive rollers 63—65, to the shaft 98, which serves the bed and scoring rolls 34—36, by means of a sprocket and chain or like transmission 103 (see Figs. 2 and 4), so that said rolls are also continuously driven. Power is transmitted from shaft 35 of the bed roll 34 of the embossing or scoring means to the shaft 28 of the feed roller 27 by means of a sprocket and chain or like transmission 104 (see also Figs. 2 and 4). It will be understood that other forms and arrangements of power transmission means may be substituted for those above described.

In the operation of the machine, a stock strip S is manually fed thereinto by the operator over the receiving platform 21, by introducing the leading end of said stock strip between the gripper roller 26 and the feed roller 27. This is done at the time the cam 31 is in position to raise the slide plate 24 and carrier arm 25, whereby to lift and thereby separate the gripper roller 26 from the feed roller 27. Thereafter, continued rotation of the cam 31 permits downward movement of the slide plate 24 and carrier arm 25, whereby to lower the gripper roller 26 so as to grip the inserted stock strip S by the nip of said gripper roller and feed roller 27, and thereupon to advance said stock strip into the machine. During such entering movement of the stock strip, the position of the cam 50 is such as to exercise lift upon the lever 48 and link 49, whereby to hold the scoring rolls 36 upswung and thus separated from the bed roll 34, so as to permit passage of the entering end of the stock strip therebetween. As a consequence of this, the leading end portion of the stock strip S passes beneath the scoring rolls 36 without contact therewith, and said stock strip is fed inward, by the gripper and feeder rollers 26 and 27, until its leading extremity abuts the normally lowered stop rod 59, whereby the forward motion of the stock strip is momentarily arrested. At the moment the leading extremity of the stock strip engages the lowered stop rod 59 by which its onward movement is arrested, the cam 31 reaches a point in its rotation operative to exercise lift upon the slide plate 24 and carrier arm 25, whereby to immediately lift the gripper roller 26 away from the feed roller 27, so that these rollers disengage the stock strip, whereby inward propulsion of the latter is discontinued. Upon such arrest of inward movement of the stock strip, the continuing rotation of the cam 50 positions the same to withdraw the lifted lever 48 and link 49 so as to release the continuously rotating scoring rolls 36 for downswinging movement, under the thrust of the spring 43, into operative engagement with the stock strip, whereby to nip the same against the rotating bed roll 34, and thereupon rapidly advance the same farther into the machine, while producing the desired scores thereon. Due to the predetermined stopped position of the stock strip at the time the scoring rolls 36 are brought into engagement therewith, said scoring rolls engage the stock strip at a predetermined distance rearward of its leading extremity, whereby to start the scores C on the face thereof at desired points rearwardly offset from its extremity (see Fig. 6). By reason of the initial advance of the leading end portion of the stock strip out of contact with the scoring rolls 36, the scores C will not be permitted to intersect the margins of the pointed tip portion of the belt or strap body, which is subsequently produced by the operation of the tip cutter 173 of a tip end cutter and scorer 164 mounted on the head member 5.

As the scoring rolls 36 are lowered into operative engagement with the stock strip S, the cam 62 is timed to reach a position to actuate the switch 61, so as to energize the solenoid 58. As thus activated, this solenoid immediately lifts the stop rod 59 out of the path of movement of the stock strip S, so that the scoring and bed rolls can thereupon advance said strip into the machine. Said cam 62 is designed to hold the switch 61 closed and the solenoid 58 energized to maintain the stop rod 59 in lifted position for a period of time long enough to allow the stock strip to complete its passage through the scoring and bed rolls. The above described operations are repeated as each successive stock strip is manually introduced into the machine by the operator or attendant.

From the scoring and bed rolls 34—36, the stock strip S is advanced so as to be engaged by the drive rollers 63—65, to be driven by the latter through the beveling and trimming means, and thence to the continuously driven feed rollers 89—90 by which said stock strip is delivered into the receiving trough 18 of the machine. The mechanisms operative to transfer the stock strips S from the receiving trough 18 to and subject to the operation of the reciprocated cutting and punching devices, to be thence discharged from the machine in finished condition, having been described in the hereinabove referred to patent application Serial No. 191,001, now Patent No. 2,690,910.

Figure 11:
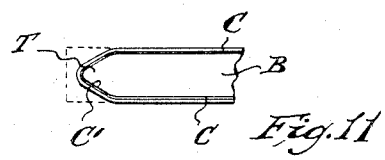
Fig. 11 is a fragmentary plan view of the tip portion of a stock strip after operation thereupon by said tip cutting and embossing or scoring device.

It remains only to point out that the tip cutting operation performed by the cutter member 173 also includes the operation of completing the scoring C by extending a matching scoring C' around the tapered tip portion T of the belt or strap body B (see Fig. 11). This latter operation is accomplished by the tip score cutter 175 with which said cutter member 173 is provided.

It will be understood that in the event given operations upon the stock strip are not desired to be performed, this may be easily arranged. If, e. g., the embossing or scoring operation is to be eliminated, the scoring rolls 36 are disposed in out-of-service position by screwing home the stop screw 45 to thereby swing and hold the bell-crank frame 39 disposed to raise and hold the scoring rolls 36 out of operative relation to the bed roll 34. If the beveling or trimming operation is to be eliminated, the cutting knives 79 may be withdrawn from operative positions by out-turning the adjusting screws 85. Cutting and punching operations may be modified by removing such of said devices as are not desired to operate.

Having now described my invention, I claim:

1. In a machine of the kind described, means for scoring marginal edge portions of the face of a stock strip, said means comprising opposed bed and scoring rolls, means for driving said rolls, releasable stop means spaced a predetermined distance inwardly from said rolls in the path of stock strip advancing movement therebetween, a driven timing cam actuated means to temporarily separate the scoring rolls from the bed roll, cooperative feeding and gripper rollers spaced outwardly from the bed and scoring rolls for initially advancing a stock strip therebetween while they are separated and thence into arrested engagement with the stop means, a second driven timing cam actuated means to control the stock strip advancing operation and release of the feeding and gripper rollers, and means to release the stop means when the scoring and bed rolls are brought into scoring and advancing engagement with the initially advanced stock strip and the feeding and gripping rollers are released.

2. In a machine of the kind described having an endwise open stock strip receiving means from which a received stock strip is delivered to cutting and punching means of the machine, opposed bed and scoring rolls positioned outwardly of said receiving means, a releasable stop means spaced a predetermined distance inwardly from said bed and scoring rolls in the path of advancing movement of a stock strip therethrough, driven timing cam actuated means to temporarily separate the scoring and bed rolls to allow passage of the leading end of an entering stock strip therebetween into arrested engagement with said stop means, cooperative feeding and gripper rollers for initially advancing a stock strip between the separated scoring and bed rolls into arrested engagement with said stop means, a second driven timing cam actuated means to control the stock strip advancing operation and release of the feeding and gripper rollers, means to withdraw the stop means from stock strip arresting position when the scoring and bed rolls are brought by their timing cam actuated means into scoring and advancing engagement with the entered stock strip and the feeding and gripper rollers are released, and driven propulsion rolls intermediate the scoring and bed rolls and said stock strip receiving means operative to advance the scored stock strip into the latter.

3. In a machine of the kind described according to claim 2, wherein the releasable stop means comprises a reciprocable stop rod, a solenoid to move said stop rod to released position, a switch to control operation of said solenoid, and a driven cam to time the operation of said switch.

4. In a machine of the kind described having an endwise open stock strip receiving means from which a received stock strip is delivered to cutting and punching means of the machine, opposed bed and scoring rolls positioned outwardly of said receiving means, a framework to support the bed roll, a bell-crank frame pivotally mounted in connection with the framework, a shaft journaled in the horizontal arm of said bell-crank frame, scoring rolls mounted on said shaft in opposition to the bed roll, a cross-head supported by the framework, a compression spring mounted on the cross-head to exert tensional thrust against the vertical arm of the bell-crank frame operative to downswing said bell-crank frame so as to yieldably urge the scoring rolls toward the bed roll, means for driving the bed and scoring rolls, adjustable stop means also carried by the cross-head for cooperation with the vertical arm of the bell-crank frame whereby to limit downswinging movement of said bell-crank frame so as to predetermine operative relation of the scoring rolls to the bed roll, a releasable stop device spaced a predetermined distance inwardly from said bed and scoring rolls in the path of advancing movement of a stock strip therethrough, means including a driven timing cam operative to upswing the bell-crank frame to temporarily separate the scoring rolls from the bed roll to allow passage of the leading end of an entering stock strip therebetween into arrested engagement with said stop device, cooperative feeding and gripper rollers for initially advancing a stock strip between the separated scoring and bed rolls into arrested engagement with said stop device, a second driven timing cam actuated means to control the stock strip advancing operation and release of the feeding and gripper rollers, means to withdraw the stop device from stock strip arresting position when the bell-crank frame is released by its timing cam actuated means to downswing the scoring rolls into stock strip engaging cooperative relation to the bed roll and the feeding and gripper rollers are released, and driven propulsion rolls intermediate the scoring and bed rolls and said stock strip receiving means operative to advance the scored stock strip into the latter.

5. In a machine of the kind described according to claim 4, wherein the releasable stop device comprises a reciprocable stop rod, a solenoid to move said stop rod to released position, a switch to control operation of said solenoid, and a third driven cam to time the operation of said switch.

6. In a machine of the kind described having an endwise open stock strip receiving means from which a received stock strip is delivered to cutting and punching means of the machine, opposed bed and scoring rolls positioned outwardly of said receiving means, a releasable stop means spaced a predetermined distance inwardly from said bed and scoring rolls in the path of advancing movement of the stock strip therethrough, driven timing cam actuated means to temporarily separate the scoring and bed rolls to allow passage of the leading end of an entering stock strip therebetween into arrested engagement with said stop means, cooperative feeding and gripper rollers for initially advancing a stock strip between the separated scoring and bed rolls into arrested engagement with said stop means, means for driving the feeding roller, means to shift the gripper roller into and out of operative relation to the feeding roller, a second driven timing cam to control said gripper roller shifting means whereby to move said gripper roller to engage said stock strip with said feeding roller for advance thereby while the scoring and bed rolls are separated and to retract said gripper roller to disengage the stock strip when the scoring and bed rolls engage the entered stock strip in scoring and advancing relation thereto, means to withdraw said stop means when the scoring and bed rolls engage the stock strip, and driven propulsion rolls intermediate the scoring and bed rolls and said stock strip receiving means operative to advance the scored stock strip into the latter.

7. In a machine of the kind described according to claim 6, wherein the releasable stop means comprises a reciprocable stop rod, a solenoid to move said stop rod to released position, a switch to control operation of said solenoid, and a third driven timing cam to open and close said switch.

8. In a machine of the kind described according to claim 1, wherein the releasable stop means comprises a reciprocable stop rod, a solenoid to move said stop rod to released position, a switch to control operation of said solenoid, and a third driven timing cam to open and close said switch.

9. In a machine of the kind described having an endwise open stock strip receiving means from which received stock strip is delivered to cutting and punching means of the machine, opposed bed and scoring rolls positioned outwardly of said receiving means, a releasable stop means spaced a predetermined distance inward from said bed and scoring rolls into the path of advancing movement of the stock strip therethrough, driven timing cam actuated means to temporarily separate the scoring and bed rolls to allow passage of the leading end of an entering stock strip therebetween into arrested engagement with said stop means, cooperative feeding and gripper rollers for initially advancing a stock strip between the separated scoring and bed rolls into arrested engagement with said stop means, means for driving the feeding roller, means to shift the gripper roller into and out of operative relation to the feeding roller, a second driven timing cam to control said gripper roll shifting means whereby to move said gripper roll to engage said stock strip with said feeding roller for advance thereby while the scoring and bed rolls are separated and to retract said gripper roller to disengage the stock strip when the scoring and bed rolls engage the entered stock strip in scoring and advancing relation thereto, means to withdraw said stop means when the scoring and bed rolls engage the stock strip, a third driven timing cam for actuating said means for withdrawing the stop means means intermediate the stock strip receiving means and said scoring and bed rolls for edge trimming the stock strip, driven propulsion rolls for advancing the stock strip through said edge trimming means, and additional driven propulsion rolls intermediate said edge trimming means and said stock strip receiving means operative to advance the scored and edge trimmed stock strip into the latter.

References Cited in the file of this patent
UNITED STATES PATENTS

| | | |
|---|---|---|
| 201,208 | Thompson | Mar. 12, 1878 |
| 310,534 | Murray | Jan. 6, 1885 |
| 347,492 | Marshall | Aug. 17, 1886 |
| 823,305 | Spencer | June 12, 1906 |
| 979,219 | Stein | Dec. 20, 1910 |
| 995,868 | Housam | June 20, 1911 |
| 1,098,689 | Seymour | June 2, 1914 |
| 1,692,755 | Mix et al. | Nov. 20, 1928 |
| 2,333,592 | Sieg | Nov. 2, 1943 |